UNITED STATES PATENT OFFICE.

THOMAS T. HOSACK, OF OIL CITY, PENNSYLVANIA, ASSIGNOR OF ONE-THIRD TO HARVEY A. LANDIS, OF DUBOIS, PENNSYLVANIA.

SOLDER FOR ALUMINUM.

No. 869,570.  Specification of Letters Patent.  Patented Oct. 29, 1907.

Application filed March 2, 1907. Serial No. 360,202.

*To all whom it may concern:*

Be it known that I, THOMAS T. HOSACK, a citizen of the United States, residing at Oil City, in the county of Venango and State of Pennsylvania, have invented a new and useful Solder for Aluminum, of which the following is a specification.

This invention relates to means for soldering aluminum, either aluminum parts together or aluminum to other metals.

The primary object is to provide an effective, non-oxidable solder composed of inexpensive ingredients that can be melted together in practically any character of melting pot or crucible over any fire of sufficient heat, said solder being of a character that will permit its being used with an ordinary soldering iron.

The solder consists of two-thirds of block tin, one-sixth of antimony and one-sixth of aluminum, the same being measured by weight. These materials are merely melted together in a melting pot or crucible over a fire sufficiently hot for the purpose, the molten composition being poured into forms and allowed to cool. The solder thus produced can be employed for securing aluminum parts together, closing holes in aluminum ware or can be used in securing together aluminum and other metal, as experience has demonstrated that other metals can be "tinned" with the solder and the parts joined together. Moreover, an ordinary soldering iron can be employed and no flux or cleaning agent has been found necessary. Experience has demonstrated that the solder will not oxidize and that the same is very strong and tenacious, parts soldered together therewith having stood a test of fifteen hundred pounds to the square inch without pulling apart.

What I claim, is:—

1. A solder of the character set forth, consisting exclusively of block-tin, antimony, and aluminum.

2. A solder of the character set forth, consisting of substantially two-thirds block-tin, one-sixth antimony and one-sixth aluminum.

In testimony, that I claim the foregoing as my own, I have hereto affixed my signature in the presence of two witnesses.

THOMAS T. HOSACK.

Witnesses:
 EDW'D S. MCALEVY,
 FANNIE T. TURNER.